(No Model.)

S. Z. PHINNEY.
CIGAR CUTTING AND BRANDING MACHINE.

No. 448,302. Patented Mar. 17, 1891.

WITNESSES:
Chas. H. Luther Jr.
E. L. Slocum

INVENTOR:
Squire Z. Phinney
by Joseph A. Miller & Co.
Attys

UNITED STATES PATENT OFFICE.

SQUIRE Z. PHINNEY, OF PAWTUCKET, RHODE ISLAND.

CIGAR CUTTING AND BRANDING MACHINE.

SPECIFICATION forming part of Letters Patent No. 448,302, dated March 17, 1891.

Application filed June 23, 1888. Serial No. 278,007. (No model.)

*To all whom it may concern:*

Be it known that I, SQUIRE Z. PHINNEY, residing in the city of Pawtucket, in the county of Providence and State of Rhode Island, have invented certain new and useful Improvements in Cigar Cutting and Branding Machines, of which the following is a full, clear, and exact description, reference being had to the accompanying drawings, forming part of this specification.

My invention relates to a hand-operating machine; and it consists, essentially, in a suitable die and a pivotal presser-cap attached to a shaft having a handle or lever for operating the device. The lever is also provided with suitable means for cutting the cigar to any desired length.

Figure 1:
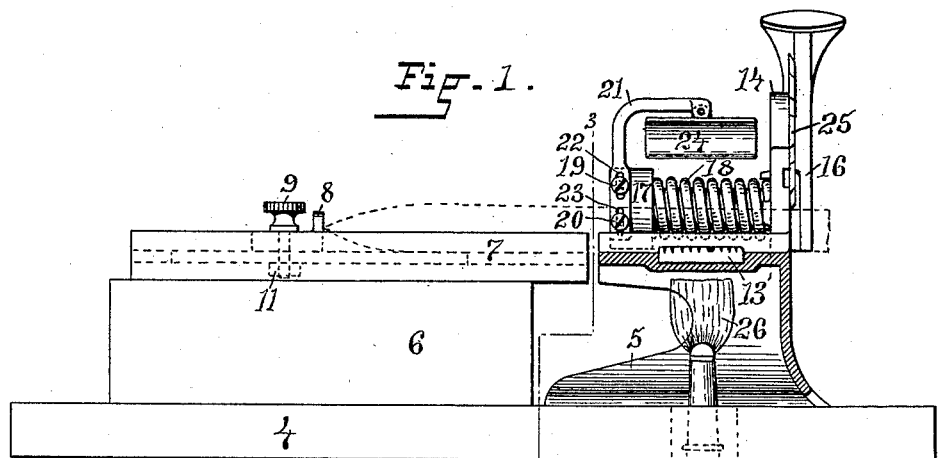
Figure 2:
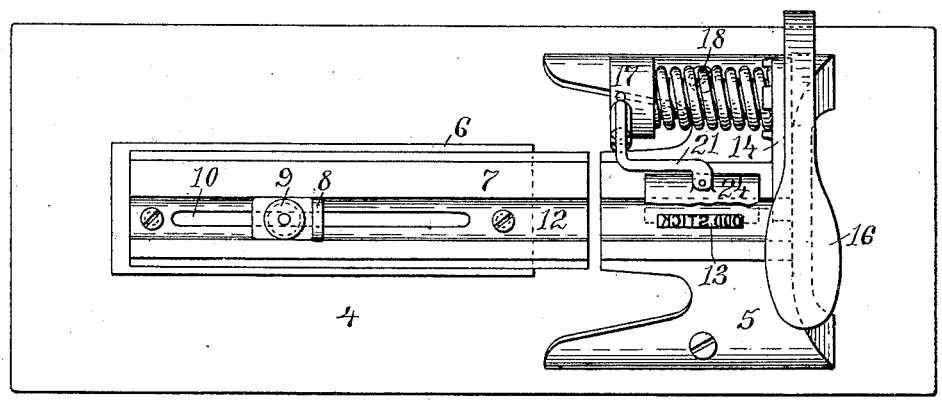
Figure 3:
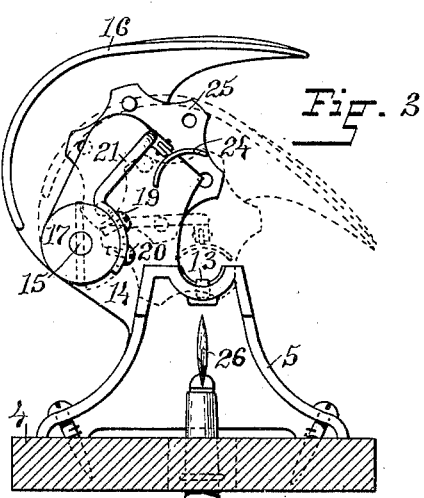

In the accompanying drawings, Figure 1 is a side view of my improved branding and cutting device with part of the supporting-frame in section, to clearly show the die and gas-flame for heating the die. Fig. 2 is a top view of the device. Fig. 3 is an end view of the branding part of the device, taken on the line 3 3 of Fig. 1.

In the drawings like numbers of reference designate corresponding parts throughout.

Referring to the drawings, 4 designates the table or bench upon which the branding-machine is mounted.

5 is the base of the branding part proper.

6 is a support upon which is mounted the gage for regulating the length of the cigar. This gage is of the usual form, and consists of the part 7, provided with the groove 12, for supporting the cigar, the slide 8, the thumb-screw 9, the shank of which thumb-screw passes through a hole in the slide, through the slot 10 in the part 7, and is screw-threaded into the nut 11, as clearly shown in Fig. 1.

The branding part proper consists of the base 5, in which is seated the branding-die 13. In the arm 14, forming part of the base, is journaled the shaft 15, having the lever 16 attached to one end and the collar 17 secured to the other end. Surrounding the shaft 15 is the coiled spring 18, one end of which is secured to the arm 14 and the other end to the collar 17, so that in the normal position the lever 16 will be elevated. To the collar 17 is attached the bent arm 21, by means of the screws 19 and 20, which pass through the slots 22 and 23. The arm 21 may be adjusted by loosening the screws 19 and 20 and moving the arm 21, as desired, by reason of the slots 22 and 23. To the free end of the arm 21 is pivotally connected the presser 24. The presser being pivoted to the arm 21 will seat itself firmly to any form of cigar, and thereby distribute the pressure exerted on the cigar so as to obtain a proper branding thereof.

I have shown a movable cutter-disk 25, attached to the lever 16 for the purpose of cutting off the ragged end of the cigar, but any other form of cutting-blade may be used for the same purpose.

Beneath the branding-die 13 and within the base 5 is placed the gas-jet 26 for heating said branding-die. If preferred, an alcohol or other flame may be used in place of the gas-jet shown. The gage part for supporting the cigar being separated from the branding part by a slight space cannot become heated when the necessary heat is applied to the branding-die.

In the manufacture of cigars one end is formed with the tip, while the other end is more or less broken or ragged and the cigars are of uneven lengths. After the cigar has been formed, and while it is still in what is known as a green condition, it is desirable to brand it with a name, such as "Odd Stick," as is shown in the drawings, or with any other name by which the peculiar make of cigars would be known in the market. It is far more desirable to brand the cigar, as no unpleasant taste is conveyed to the user, as would be the case were the cigar marked with a label, tag-ring, or other device of paper, as is the common practice.

The branding is accomplished as follows: The cigar having been made, the gage is set at the proper distance from the cutting-edge of the device for the required length of the cigar, and the die having been heated by the gas or other flame the cigar is placed in the groove 12 with the unfinished end extending beyond the cutting-blade and the tapering or pointed end of the cigar being placed against the slide 8 of the gage. The lever 16 is then depressed, carrying with it the arm 21, provided with the presser 24, which will adjust itself to the shape of the cigar and the cigar will be pressed down onto the branding-die 13 with a uniform pressure, and at the same time the ragged or unfinished end of the cigar will be cut off by the cutter-blade, thereby branding and cutting the cigar to the desired length at one and the same operation.

Having thus described my invention, I claim as new and desire to secure by Letters Patent—

1. In a device for cutting and branding cigars, the combination, with the cutter and adjustable stop for regulating the length of the cigar, of a concaved bed having the branding-die fixed in the same, a lamp for heating the die, and a presser constructed to force the cigar against the die and hold the same during the cutting of the end, as described.

2. A device for cutting and branding cigars, consisting of a concaved bed, an adjustable stop to regulate the length of the cigar, a die fixed in the concaved bed, a light for heating the die, a cutter-knife, and a presser yieldingly secured to and operated by the cutting-lever, as described.

3. The combination, with a concaved bed, an adjustable stop, and a cutter operated by a hand-lever, of a branding-die located in the concaved bed, a lamp, and a spring-pressed presser-arm constructed to support a cigar, regulate its length, and cut off the end of the cigar while branding the same, as described.

4. The combination of the lever 16, provided with the shaft 15, carrying the collar 17 and the spring 18, the arm 21, adjustably attached to said collar and provided with the presser 24, the branding-die 13, and the gage, substantially as described.

5. The combination of the lever 16, the shaft 15, the spring 18, the collar 17, the arm 21, the presser 24, the cutter 25, the branding-die 13, and the gage, substantially as herein shown and described.

6. In combination, the base 5, the branding-die 13, the arm 14, the lever 16, provided with the cutter 25, the shaft 15, spring 18, collar 17, adjustable arm 21, carrying the presser 24, and the gage consisting of the part 7, the slide 8, thumb-screw 9, and nut 11, substantially as described.

SQUIRE Z. PHINNEY.

Witnesses:
M. F. BLIGH,
J. A. MILLER, Jr.